United States Patent [19]

Lieser

[11] 4,024,615

[45] May 24, 1977

[54] KNIFE HEAD, PARTICULARLY FOR POLYGONAL TURNING MACHINES

[75] Inventor: Karl Lieser, Wuppertal, Germany

[73] Assignee: Hermann Werner, Wuppertal, Germany

[22] Filed: July 8, 1976

[21] Appl. No.: 703,678

[30] Foreign Application Priority Data

Nov. 14, 1975 Germany .......................... 2551183

[52] U.S. Cl. .............................. 29/105 R; 29/105 A
[51] Int. Cl.² ........................................... B26D 1/12
[58] Field of Search ...................... 29/105 R, 105 A

[56] References Cited

UNITED STATES PATENTS

| 2,242,363 | 5/1941 | Michon ............................ 29/105 R |
| 3,378,901 | 4/1968 | Dupuis ............................. 29/105R |
| 3,847,555 | 11/1974 | Pegler et al. ...................... 29/105 R |

FOREIGN PATENTS OR APPLICATIONS

| 1,143,082 | 6/1960 | Germany ......................... 29/105 A |

Primary Examiner—Leonidas Vlachos
Attorney, Agent, or Firm—Martin A. Farber

[57] ABSTRACT

A knife head, particularly for multi-edge lathes having knives held in plates and braceable in their operating position, which plates are adjustable, in order to obtain a radial adjustability of the knives, by means of an eccentric tool which is insertable in a bore in the knife head. There is coordinated to the eccentric tool-insertion bore which is directed onto the rear surface of the plate, a recess laterally offset thereto which is formed in the rear wall of the plate for the insertion therein of an eccentrically offset end of the eccentric tool.

9 Claims, 4 Drawing Figures

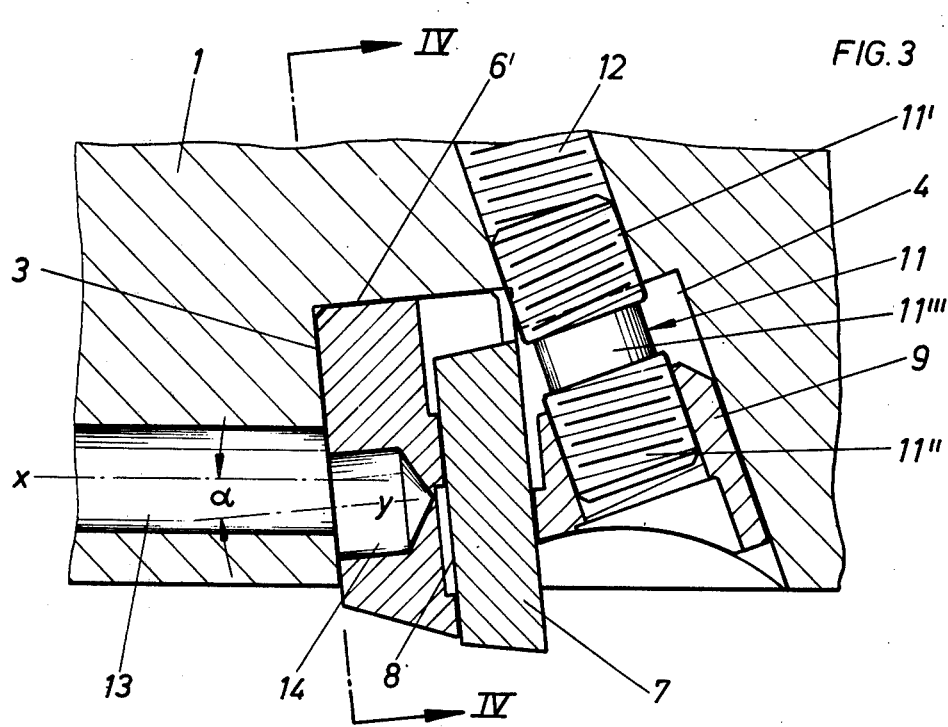
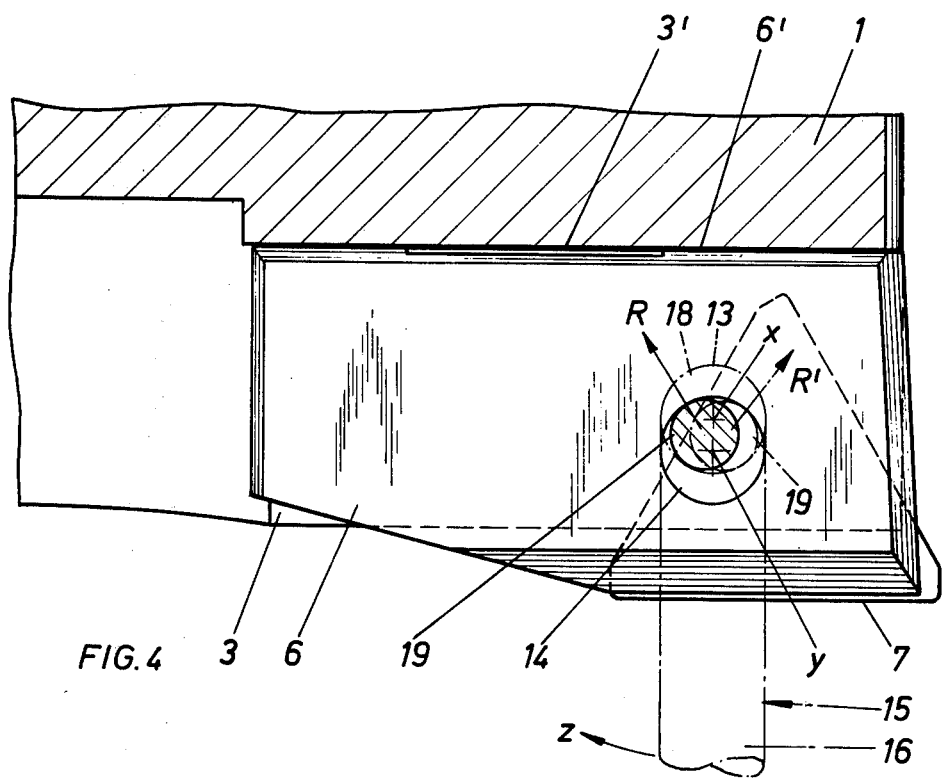

KNIFE HEAD, PARTICULARLY FOR POLYGONAL TURNING MACHINES

The invention relates to a knife head, particularly for multi-edge or polygon lathes, with knives held in plates and braceable in their operating position, which plates are adjustable, in order to obtain a radial adjustability of the knives, by means of an eccentric tool which is insertable in a bore in the knife head.

Such type of knife heads are supposed to bring the advantage of being able to facilitate exchange or replacement, or adjustment of damaged or worn knives. By one known design the bore for receiving of the eccentric work tool extends perpendicularly to the direction of displacement of the plate before or in front of its front side which is not provided with a knife. The adjustment of the knives by use of profile projectors is undertaken such that for the time being clamping jaws which step against the plate and the knife, are released. Thereafter by the eccentric work tool inserted in the bore and turning of the same, the plate can be displaced such that, thereby, an adjustment of the knife takes place. If the cutter edge has assumed the corresponding position in the cross hairs of the profile projector, application or engagement of the clamping jaws occurs. In connection with this, yet frequently, there occurs a dislocation of the plates and of the knife, respectively, so that the adjustment procedure must once again be undertaken. Thus the adjustment with such a knife head requires patience, expert knowledge and increased time expenditure, which lead to higher costs.

It is an object of the present invention, particularly, that is additionally to the tasks and objects which may be derived from the specification and claims, to provide a knife head of the introductory-mentioned generic type having a technically simple manufacture and advantageous useful construction, of such type, that the adjustment of the knives can be carried out in a short period of time.

This object is solved in accordance with the present invention in a manner that there is coordinated to the eccentric tool-insertion bore which is directed onto the rear surface of the plate, a recess laterally offset thereto formed in the rear wall of the plate for the insertion of the eccentrically offset end of the eccentric tool.

As a consequence of such a formation, a knife head of the introductory mentioned type is provided of increase usefulness. The adjustment of the knives, for example, with the aid of profile projectors can occur in a short period of time. After untightening of the bracing, the plate is allowed to be displaced by means of the eccentric work tool which is pushed into the eccentric tool - insertion bore. Further, the eccentrically offset end of the eccentric work tool engages in the correspondingly arranged recess of the rear wall of the plate. In this manner a positive engagement without slipping is realized, so that the plate can be displaced in two directions by means of the inserted eccentric work tool, to the contrary of the state of the art. No matter in which direction the displacement of the plate takes place, by the offset end of the eccentric tool the plate is forced in a flat or even installation position relative to the knife head. Thus there is no danger of an additional dislocation with the bracing of the plate and of the knife, respectively, which otherwise would require a renewed adjustment. The eccentric work tool accordingly fulfills, in connection with the advantageous arrangement of the recess and of the eccentric work tool, a double function, by which on the one hand it serves for the displacement of the plate and on the other hand it serves for the adjustment or alignment of the same. After completion of the adjustment of each knife, the eccentric tool can again be withdrawn out of the respective insertion bore of the knife head.

An advantageous feature of the present invention resides in that the recesses have a circular-shaped cross-section, and the offset of the same, with respect to the eccentric tool - insertion bore, is directed in a direction away from the base surface of the plate. This measure brings technical production advantages. For the recess, a hole simply needs to be bored. Further working is unnecessary.

Moreover it is yet advantageous in accordance with the present invention, that the axis of the insertion bore and that of the recess are angularly oriented with respect to each other. Accordingly the eccentric offset end of the eccentric work tool arrives in a tilted or edgewise arrangement relative to the recess, which permits an extremely sensitive adjustment. Still an angle is choosen such that no disadvantages occur with the adjustment.

With the above and other objects in view, the present invention will become more clearly understood in connection with the following detailed description of a preferred embodiment example of the invention, in connection with the accompanying drawings, of which:

FIG. 3 is an enlarged cross-sectional view through a portion of the knife head in the range of an eccentric work tool - insertion bore;

FIG. 4 is a section taken along the line IV—IV of FIG. 3.

Figure 1:
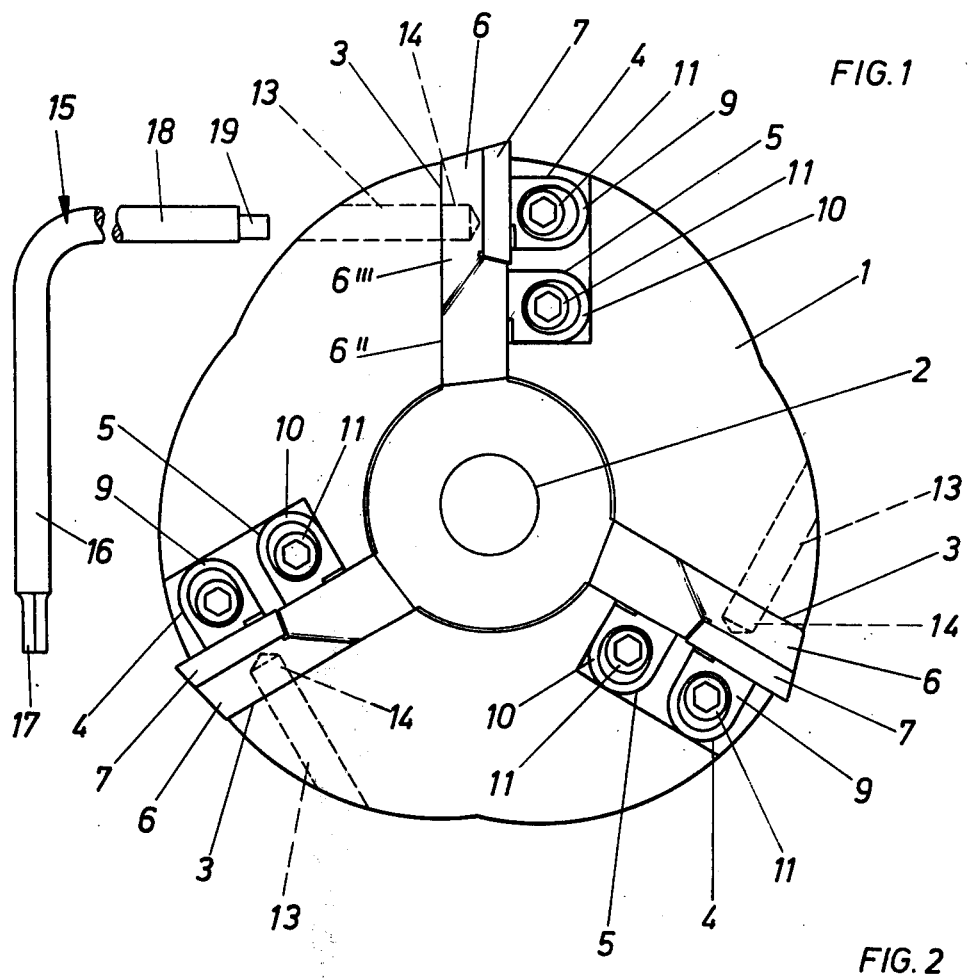
FIG. 1 is a front elevational view toward the knife head with associated eccentric work tool.

Referring now to the drawings, the knife or cutter head in accordance with the present invention includes a work tool carrier 1. A bore 2 is formed centrally in the tool carrier 1 in order to be able to insert or mount the knife head on a work spindle.

Three plug-in grooves or channels 3 are formed in the work tool carrier 1, arranged in equal angular distribution. Reception notches or niches 4 and 5 are formed adjacent and coordinated to each plug-in channel 3.

Figure 2:
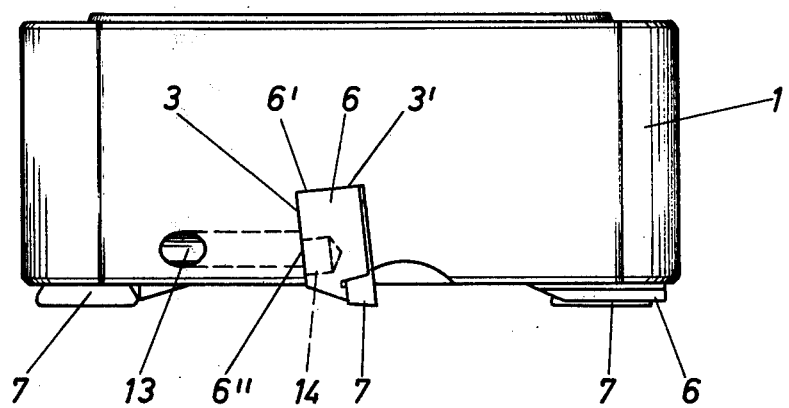
FIG. 2 is a plan view of the knife head of FIG. 1.

The plug-in channels 3 are formed so as to be inclined with reference to the axis of rotation of the cutter head, as may be noted from a comparison of FIGS. 2 and 3. Each plug-in channel 3 receives a plate 6 therein, the base surface 6' of which is supported on the bottom or interior surface 3' of the respective plug-in channel 3.

The outer end of each plate 6 is provided with a cavity 8 which is adjusted or complementary to the contour of the knife 7. In the embodiment example, a triangular shaped knife 7 has been selected, which is formed as a so-called reverse or turn-over platelet (in German called a "Wendeplattchen").

In gripping jaws 9, 10 which are arranged in the niches 4, 5, respectively, the knives 7 are held in the working or operative position. The clamping jaw 9 steps directly against the knife 7, whereas the other clamping jaw 10 presses against the plate 6. Locking screws 11 which are formed with an inner polygon or hexagon recess (cf. FIG. 1) are provided for bracing and support. The inside end 11' of the screws 11 is formed with a right-handed screw thread and the outside end 11'' is equipped with a left-handed screw thread. Both thread sections are separated by a band 11'''. The end 11' meshes in a screw thread 12 of the work tool carrier 1, whereas a screw thread in the clamping jaw is operatively coordinated to the other thread end 11''.

The tool carrier 1 is formed with an eccentric tool - insertion bore 13 which is directed onto the rear surface 6'' of the plate 6. In the embodiment example the bore 13 has a diameter of 6 mm.

In the rear wall 6''' of the plate 6, a recess 14 circularly shaped in cross-section is formed or worked therein, offset to the insertion bore 13, but communicating therewith. This recess 14, which extends substantially in the center range of the plate, has in this embodiment example also a diameter of 6 mm. The direction of the offset of the recess 14 relative to the insertion bore 13 is directed away from the base surface 6' of the plate 6. In the embodiment example, the offset is approximately 1.5 mm.

As may particularly be recognized from FIG. 3, the axis $x$ of the insertion bore 13 and the axis $y$ of the recess 14 run oriented at an angle relative to each other. This angle alpha ($\alpha$) amounts to 6° in the embodiment example, and corresponds to the inclined position or inclination of the corresponding plug-in channel 3 of the work tool carrier 1.

The eccentric work tool 15 is constructed as a multipurpose work tool. It has an angular shape. One of the angle legs 16 forms on its end a polygon portion 17 for releasing and tightening, respectively, the locking or tightening screws 11; whereas the other angle leg 18 has the eccentrically offset end 19 at its end. The diameter of the set off end 19 is 4 mm in the embodiment example.

If a resetting or adjustment of the knives 7 are to be undertaken, for the present time being, the clamping jaws are to be untightened or released by means of the tool 15. Afterwards, now the angle leg 18 of the eccentric tool 15 is to be pushed into the complementarily cross-sectionally adjusted insert bore 13. With simultaneous turning and pushing of the eccentric tool 15, the eccentrically offset end 19 enters and catches into the recess 14 of the plate 6. Now the displacement of the plate 6 can take place by turning of the eccentric tool 15.

According to FIG. 4, the eccentric work tool 15 is also illustrated as having assumed the dot-dashed line position. The offset end 19 steps or acts against the corresponding wall section of the recess 14 (namely the upper wall section in FIG. 4 - actually the "bottom" section facing toward the bottom surface 3' of the channel 3). The force component R is directed to the base surface 6' of the plate, whereby the same is forced in installation arrangement or mounted position to the bottom surface 3' of the plug-in channel 3.

By further turning of the eccentric work tool 15 in the direction of the arrow $z$, there occurs a radially inward displacement of the plate 6. During swinging of the eccentric ork tool in an opposite direction, i.e., counter to the arrow direction $z$, the plate 6 is displaced radially outwardly relative to the work tool carrier 1. However with each displacement, force components are directed onto the bottom surface 3' of the plug-in channel 3, so that in this manner an adjustment takes place. After the corresponding alignment or orientation of the knife, the clamping jaws 9, 10 then can be brought into operational effect without the danger of there occurring an unintended shifting of the knife with respect to the hairline cross or reticule of the profile projector. Since the force components R and R', respectively, act in the direction of a flat or planar installation arrangement between the bottom surface 3' of the plug-in channel 3 and of the base surface 6' of the plate 6, any tilting of the plate 6 is excluded and prevented, so that an optimum adjustment precision is realizable.

While I have disclosed one embodiment example of the present invention, it is to be understood that this example is given by example only and not in a limiting sense. Likewise the mentioned dimensions are given only by example without limitation.

I claim:

1. A knife head, particularly for polygonal turning machines, with knives held in plates and braceable in their operative position, the plates being adjustable so as to obtain a radial adjustability of the knives by means of an eccentric tool which is insertable in a bore in the knife head, comprising a tool carrier formed with eccentric tool - insertion bores adapted to receive therein an eccentric tool formed with an eccentrically off set end, a plurality of plate means radially adjustably mounted in said tool carrier for holding the knives, respectively, each of said plate means including a rear wall formed with a recess therein, said rear wall defining a rear surface of said plate means, said eccentric tool - insertion bores, respectively, being directed onto said rear surface of said plate means, respectively, and communicating with said recess, said recess being formed in said rear wall laterally offset relative to said insertion bore communicating therewith, and adapted for insertion therein of the eccentrically off set end of the eccentric tool, whereby said plate means is radially adjustable to said carrier by a rotation of said eccentric tool.

2. The knife head, as set forth in claim 1, wherein said plate means includes a base surface, said recess is circular-shaped in cross-section and is offset relative to said eccentric tool - insertion bore in a direction away from said base surface of said plate means, whereby the eccentrically off set end of the eccentric tool operatively presses said plate means with a force component towards said base surface simultaneously while radially displacing said plate means.

3. The knife head, as set forth in claim 1, wherein said insertion bore defines a bore axis, said recess defines a recess axis, said bore axis and said recess axis extend angularly with respect to each other.

4. The knife head, as set forth in claim 1, wherein said tool carrier is formed with plug-in channels having a bottom surface, said tool carrier defines an axis of rotation, said plug-in channels are inclined relative to said axis of rotation of said carrier, said plate means has a base surface supported on said bottom surface of said plug-in channels, respectively, and an outer end formed with a cavity adjusted to the contour of the knives, respectively, said tool carrier is formed with niches adjacent each of said plug-in channels, clamping jaws positioned in said niches, respectively, abutting said plate means and the knife, tightening means for tightening said clamping jaws in bracing engagement against said plate means and the knife, respectively.

5. The knife head, as set forth in claim 4, wherein said tightening means constitute locking screws each having right- and left- handed screw threads, operatively engaging in said tool carrier and said clamping jaws, respectively.

6. The knife head, as set forth in claim 1, wherein said insertion bore has a diameter substantially equal to that of said recess.

7. The knife head, as set forth in claim 1, wherein said recess is formed in a center range of said plate means.

8. The knife head, as set forth in claim 1, wherein said tool carrier is formed with plug-in channels substantially radial relative to said tool carrier and having a bottom surface, said plate means is radially adjustably positioned in said channels supported on said bottom surface, an eccentric tool means having a leg substantially complementary to said eccentric tool - insertion bore, and formed with an off set end for being inserted in said recess and for adjusting said plate means upon rotation of said tool means in a radial direction as well as toward said bottom surface.

9. The knife head, as set forth in claim 4, wherein said recess defines an axis parallel to the inclination of said plug-in channels, respectively.

* * * * *